United States Patent [19]
Saunders et al.

[11] 3,987,058
[45] Oct. 19, 1976

[54] PREPARATION AND USES OF STABLE, BOUND STATIONARY PHASES

[75] Inventors: Donald H. Saunders, Oreland;
Robert A. Barford, Willow Grove;
Paul Magidman, Warrington;
Herbert L. Rothbart, Flourtown, all of Pa.

[73] Assignee: The United States of America as represented by the Secretary of Agriculture, Washington, D.C.

[22] Filed: Feb. 27, 1975

[21] Appl. No.: 554,052

[52] U.S. Cl. ............................ 260/326.2; 55/386; 210/198 C; 210/502; 260/326.31; 260/505 A; 260/499; 260/430; 252/426; 210/31 C
[51] Int. Cl.$^2$ ........................................ B01D 15/08
[58] Field of Search ............... 55/67, 386; 210/24 C, 210/198 C, 502, 31 C; 260/2 S, 326.31–326.39, 326.2, 430, 426, 499, 505; 252/426

[56] References Cited
UNITED STATES PATENTS

| | | | |
|---|---|---|---|
| 3,598,767 | 8/1971 | Kovacs et al. | 260/2 S |
| 3,655,615 | 4/1972 | Bush et al. | 260/2 S |
| 3,722,181 | 3/1973 | Kirkland et al. | 55/386 X |
| 3,878,092 | 4/1975 | Fuller | 55/386 |

OTHER PUBLICATIONS

Introduction to Modern Liquid Chromatography by Snyder and Kirkland, John Wiley and Sons, New York, N.Y. 1974, pp. 294–299 relied on.

*Primary Examiner*—John Adee
*Attorney, Agent, or Firm*—M. Howard Silverstein; William E. Scott; David G. McConnell

[57] ABSTRACT

Sulfobenzylsilicas in which the organic moiety is bound to silica surfaces through a carbon-silicon bond are prepared by treating silica with thionyl chloride to chlorinate reactive silanol groups, reacting the product with benzyllithium and sulfonating the resulting benzylsilica. The sulfobenzylsilicas and their salts of noble metals are useful as bound stationary phases in various chromatographic procedures for the separation of a wide variety of natural product mixtures composed of closely related chemical compounds. For example, separation of methyl cis 9-octadecenoate and methyl trans 9-octadecenoate was readily achieved by gas-liquid chromatography on a modified silver sulfobenzylsilica column.

16 Claims, No Drawings

PREPARATION AND USES OF STABLE, BOUND STATIONARY PHASES

This invention relates to rigid cation exchangers with enhanced chemical, light, solvent and temperature stability and more particularly to the preparation and use of sulfobenzylsilicas and their salts of noble metals in separating closely related saturated and unsaturated alkenyl derivatives including cis and trans isomers of alkenes and their corresponding alkenoic esters.

Sulfobenzylsilicas have been prepared previously (Anal. Chem. 44, 90–92, 1972) but the method and result was considered unsatisfactory for the purposes of this invention. In fact, the product of the prior art had only 0.01 to 0.0124 milliequivalents of acid per gram compared to more than 0.2 milliequivalents per gram in the product of this invention. In other words, the process of the present invention is at least twenty times more effective than that of the prior art.

One object of this invention is to replace surface silanol groups with organic groups bound to silicon atoms, which initially were part of the particle surface matrix, through a stable carbon-silicon bond to obtain a cation-exchange phase bound to silica that is useful in analytical and preparative separation of a wide variety of natural product mixtures using procedures such as gas-liquid, thin-layer, liquid, and high pressure liquid chromatography.

Another object is to provide a means of recovering vitamins, proteins, and other highly desirable nutrients that are lost in food processing.

Still another object is to provide a means of isolating and identifying trace amounts of toxic or otherwise undesirable substances in foodstuff.

A further object is to provide a rapid analytical procedure applicable to food products.

A still further object is to provide a means of separating cis and trans isomers.

Another further object is to provide selective, stable, useful and heterogeneous catalysts.

In general, according to this invention the above objects are accomplished by chlorinating reactive silanol groups of solid, anhydrous silica, reacting the product with an aralkyllithium, -sodium, or -potassium compound and sulfonating the aralkyl-silica to obtain the desired sulfoarylsilica. The invention is exemplified with the benzyl derivative, that is, silica chloride, prepared by reacting at an elevated temperature, silica with thionyl chloride, is reacted with benzyllithium and the resulting benzylsilica is sulfonated.

The silica particles used as the support in this invention may be spherical or irregular in shape, vary in diameter from less than 10 microns to 300 microns or more and may be porous, semiporous, or nonporous. The pore size may vary in diameter from less than 20 to greater than several hundred angstroms. The surface area of the particles may vary from more than several hundred square meters per gram to less than 10 meters per gram.

Surface silicon atoms of these particles may be bonded to from 3 to 0 sulfonated organic groups, (i.e. some may be unreacted) or some may be bonded to organic groups containing no functional substituents (i.e. saturated hydrocarbons). Also, some of the surface of the silicon atoms may be bonded through a silicon-oxygen-silicon bond to silyl groups of the general formula

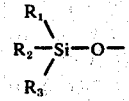

where $R_1$, $R_2$, and $R_3$ are the same or different organic groups.

Included within the scope of this invention are all sulfonated aralkyl groups having the general formula:

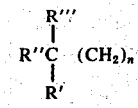

where $n$ is 0 to 17, $R'$ is sulfonated aryl group such as sulfonated phenyl and sulfonated naphthyl, $R''$ and/or $R'''$ is hydrogen, alkyl, or the same sulfonated aryl group as $R'$ and where the sulfonated aralkyl groups are bonded to silicon atoms that are part of the original particle surface matrix. A specific example where $n = 0$, $R' =$ sulfonated phenyl and $R''$ and $R'''$ equal hydrogen is in sulfobenzylsilica

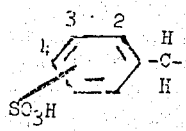

where the sulfonic acid group may occupy positions 2, 3, or 4.

The process of preparation involves reacting solid, anhydrous silica at an elevated temperature with thionyl chloride as a vapor, pure liquid, or as a solute in a dry polar solvent such as benzene or chloroform.

The resulting silica chloride is reacted with aralkyl lithium, -sodium, or -potassium compound. The resulting organosilica product has an aromatic group bonded through a stable methylene group to surface silicon atoms, for example:

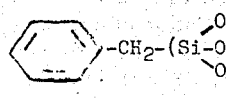

where

represents one silicon atom at the surface of a silica particle.

The resulting benzyl, or, in general, aralkyl silicas may be reacted with sulfuric, fuming sulfuric or chlorosulfonic acid. For the purposes of this invention benzylsilica is reacted with chlorosulfonic acid in anhydrous chloroform to yield desired sulfobenzylsilica.

The sulfobenzylsilicas are stable at 200° C. or higher in a helium atmosphere, and in aqueous systems in which the media ranges from strongly acidic to moderately basic. As salts of noble metals such as silver, they are used in gas-liquid chromatography to separate closely related saturated and unsaturated alkenyl derivatives including cis and trans isomers of alkenes and their corresponding alkenoic esters.

Noble metal salts of sulfobenzyl silicas prepared from silicas having a particle size of about 12 microns have similar applications in thin-layer chromatography.

Sulfobenzylsilicas may be used in the sodium form to separate a variety of closely related compounds such as nitrosamines from the corresponding amines in both thin-layer and liquid chromatography, and also to separate mixtures of similar nitro and amino derivatives by high pressure liquid chromatography.

The materials are also useful as catalysts for a variety of liquid- and gas-phase reactions. In particular, those reactions catalyzed by the co- or counter ions of the ionogenic groups as well as those catalyzed by silica surfaces.

In view of the fact that many presently available bound phases are degraded by solvents the sulfobenzylsilicas of this invention, being stable, offer many advantages. In contrast to resins based on flexible matrices, the supports with bound phases of this invention are rigid and undergo no swelling on solvation or shrinking on drying. They are stable at higher temperatures than most presently available phases and can be sterilized or treated with concentrated acids and other chemicals without giving rise to degradation products that contaminate materials being separated. This is an important feature because virtually all other phases do produce degradation products. These properties make sulfobenzylsilicas useful in the analyses and separation of pure components from agricultural and processed foods and in determining the nutritive, biological, or toxicant properties of food components.

In addition to being stable, stationary phases prepared by the process of this invention have many other advantages. They are permanently and chemically bound to the support and they will not move or "bleed" into the mobile phase and contaminate the materials being separated. The noble metal salts of sulfobenzylsilica are more active and more stable than supports impregnated with silver salts. Thus the silver salts of sulfobenzylsilica are less affected by light and may be reused several times without loss of activity. They have increased ion-exchange capacity which is very useful in the preparative isolation of pure compounds. They are also very useful as catalysts. Efficient catalysis requires large catalyst surface area. Organic-type ion exchangers are limited in gas phase reactions since they tend to shrink when dry which results in pore closing and poor availability of internal surfaces. Inorganic ion exchangers are used in these cases because of their open rigid structure but the pores are relatively small resulting in restricted mobility of reactants in the catalysts. This effect is particularly objectionable in liquid phase reactions and thus organic cation exchangers are used in such systems. Unfortunately this restricts the choice of solvents to those which can swell the resin or to resins with rigid macroporous matrices. These resins have mixtures of domains of macro- and microporous matrices and in unswollen systems potential catalytic activity of microporous matrices is wasted. Both types of ion exchangers are limited in stability. Inorganics are particularly susceptible to acids and organics are thermally unstable. In addition oxidizing agents break crosslinks in organic exchangers resulting in variation of resin properties with time and contamination of solutes with degradation of the resin. The present invention is superior in characteristics to both types of presently utilized ion exchangers in catalysis. The silica matrix is rigid and so the resultant cation exchanger formed by bonding to the matrix is not dependent upon swelling in solvents as are organic exchangers. The pore size may be selected by use of appropriate silicas as starting materials. This makes it superior to inorganics in which only certain pore sizes are available or organics in which pore size varies with conditions such as solvent. All of the ionogenic groups are available in contrast to macroporous organic exchangers. The cation exchanger of this invention is highly stable in contact with liquids and particularly stable in acids in contrast to inorganic exchangers. It contains no organic crosslinks and is thus not subject to oxidative decrosslinking as are organic exchangers. Its demonstrated stability as a gas-liquid-chromatographic phase contrasts greatly with the lack of stability of organic ion exchangers.

A sulfobenzyl group bonded to a silicon atom at the surface of a particle can be represented as follows:

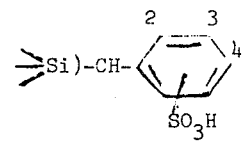

where the sulfonic group may occupy position 2, 3, or 4 of the benzene ring.

Other sulfonated aromatic groups may be bound to silicon atoms at the surface of silica particles to give a product of the generalized formula

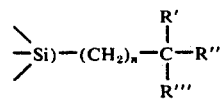

where $n$ may be a whole integer from one to 17 or the —CH may be omitted and the

group is bonded directly to silicon atoms at the particle surface and R' is sulfonated aryl group such as sulfonated phenyl and sulfonated naphthyl R'' and R''' may be the same as R', or they may be alkyl or hydrogen.

The improved process of this invention is exemplified by the following description of a preparation of sulfobenzylsilica:

28.7 grams of a silica with particles averaging 12 microns in diameter were weighed into a 3-neck, 500 ml, round-bottom flask and mixed with 172.2 gm of thionyl chloride. The flask was evacuated at room temperature until the thionyl chloride boiled and then it was repressurized with dry nitrogen gas. The process was repeated at −70° C. Then the slurry was boiled in a bath at 85°–90° and cooled to ambient room temperature (about 20°–25° C.). The slurry was stirred for 24 hours at ambient room temperature and then for 20 hours while heating at reflux temperature. The slurry was then cooled and filtered through a 350 ml. glass Buchner with a fine frit and kept under a dry $N_2$ gas atmosphere. 150 ml. of fresh thionyl chloride reagent was used in small portions to wash the silica chloride filter cake. The filter cake was dried by passage of dry nitrogen until it was easily powdered and then it was transferred to a 500 ml. round bottom flask. The bulk of the adhering reagent was distilled off by heating the powder gradually to 200° C. The flask was then cooled to room temperature, evacuated at 0.1 mm Hg, and gradually heated to 200° C. and held at this temperature for 5 hours. The yield of silica chloride was 28.0 g. and it contained 1.15 m.e.q. of chloride per gram of product.

25.8 grams of silica chloride (29.8 milliequivalent) was mixed under dry argon gas at −20° C. with a precooled solution of benzyllithium (96.2 milliequivalents) in a dry 2:1 mixture of tetrahydrofuran and ethyl ether. The chocolate brown slurry was allowed to warm to room temperature and stirred slowly for 14 hours. The slurry was then heated at reflux temperature for 3 hours, cooled to −30° C., and quenched with 30 ml. of concentrated hydrochloric acid. A light yellow suspension formed and was filtered off on a fine-frit, 350 ml. Buchner funnel and washed with 95% ethanol and then with deionized water until it was free of acid and chloride ion. The filter cake was then washed with several small portions each of absolute ethenol, acetone, and chloroform, and dried on the filter until it was easily powdered. It was given a final drying by heating it, under 0.1 mm Hg vacuum, gradually to 100° C. and holding it at 100° C. for 5 hours. The yield of benzylsilica was 25.62 grams and it contained 5.33% carbon (0.63 milliequivalent, benzyl group/gram).

24.1 gm. of the benzyl silica was suspended in 150 ml. dry chloroform and a solution of 25 gm. of chlorosulfonic acid in 180 ml. dry chloroform was added rapidly in a dropwise fashion and the dilute slurry was stirred slowly at ambient room temperature for about 22 hours. The product that formed was filtered on a fine-frit glass Buchner and washed repeatedly with chloroform, and then with deionized water (until free of acid and chloride ion), and with 60% ethanol, absolute ethanol, and acetone. The sulfobenzylsilica, now nearly free of color or other extractable impurities, was dried under high vacuum at 100° C. for 5 hours. Elemental analysis indicated the presence of 0.57 milliequivalents benzyl group/gram and 0.38 milliequivalents sulfonic acid group/gram of product.

Sulfobenzylsilica prepared from 12 micron diameter particle silica by the process just described is very useful in its sodium form in high pressure liquid chromatography (HPLC) to separate nitro compounds such as nitrosamines from the corresponding amines and to fractionate and recover pure components from mixtures of pharmaceuticals and amino acids. The silver salt of sulfobenzylsilica is useful in the thin-layer and liquid chromatography to separate saturated and unsaturated triglycerides and cis and trans isomers of unsaturated fatty esters.

This invention is not limited to sulfobenzylsilicas prepared from silica particles averaging 12 $\mu$ in diameter. In fact, the silver salt of sulfobenzylsilica prepared from larger silica particles is very useful in separating by gas liquid chromatography cis and trans isomers of unsaturated long chain hydrocarbon derivatives and in separating by liquid chromatography nitrosamines from extracts of bacon.

In addition to a general discussion of sulfobenzylsilicas, the preparation of sulfobenzylsilica from silica with a particle diameter range of 60 to 200 $\mu$ and a surface area of 340 m$^2$/gram, from silica with an average particle diameter of 0.012 $\mu$ and a surface area of 198 m$^2$/gram, and from silica with a particle diameter of 8 $\mu$ and a surface area of 320 m$^2$/gram is adequately described in Analytical Chemistry 46, 834–838, 1974. Consequently, that disclosure will not be repeated herein but it will hereafter be considered incorporated as part of this invention into this specification by the foregoing reference.

We discovered that in the process of this invention pure thionyl chloride was much preferred to a solution of the reagent in dry benzene because with the latter reagent it was not possible to obtain maximum chlorination of silica. In the next step of the process, preparation of benzylsilica, benzyllithium was found to be preferable over other reagents such as benzyl magnesium chloride because it reacts more extensively thus providing more product to sulfonate. Destruction of excess organolithium reagent after the arylalkylation of silica by addition of a slight excess of concentrated hydrochloric acid was found to be preferable to quenching with water or aqueous alcohol because the alkaline lithium hydroxide resulting from such neutral quenching caused scission of the aryl group from silicon.

We also found that an anhydrous halogen containing solvent such as chloroform is preferable as a reaction medium in the sulfonation of the benzylsilica. When acetone was used as the medium, no sulfonation of the benzylsilica occurred.

For the purposes of this invention it is very important that the reaction with the silica surface be as complete as possible because unreacted silica cannot be separated from the desired product. Therefore, it is important that in the three main steps of the process of this invention an amount of reagent (thionyl chloride, benzyllithium, chlorosulfonic acid) in excess of the stoichiometric amount relative to silica be present to insure as complete a reaction as possible. The stoichiometric amounts of the reagents depends on the amount of reactive sites per gram of silica. Since reactions take place at exterior and interior pore surface of a solid silica particle and the reagent in each step is a liquid or present as a solution, the reaction is two-phase and thus requires more time than when all reactants are in one homogeneous phase.

Briefly, the following precautions are recommended for the successful practice of this invention. Unless absolutely necessary, heating of chlorosulfonic acid with the material to be sulfonated should be avoided because, in addition to producing colored degradation products, it partially removes the benzyl group. Care should be taken in the preparation of benzyllithium because if the benzyl methyl ether used to prepare it is oxidized, the benzyllithium prepared from it will not react with silica chloride and thus no benzylsilica will be obtained. The product of the first step of the process, silica chloride, must be kept dry to keep it from decomposing.

The products of this invention, the sulfobenzylsilicas, are acid in nature and may be titrated with standardized alkaline reagents. The organic moiety of the product is bound to the silica surfaces through a carbon-silicon bond. Reaction with silver nitrate produces the solid silver benzylsulfonate chemically bound to silica. Analyses of sulfobenzylsilicas, after exposure to elevated temperatures, various chemicals, and solvents, by such methods as potentiometric titration, elemental analysis and spectrophotometric analysis showed little observable loss of ion-exchange capacity. When a column packed with $Ag^+$- sulfobenzylsilica was installed in a gas chromatograph and operated at 180° C. with helium ($H_2$ free) as carrier, it maintained the capability of resolving reference mixtures of cis and trans alkene isomers in excess of 30 days, thus demonstrating its thermal stability. The visible bleed level was essentially undetectable at or below 200° C when the effluent gases were passed through a flame ionization detector having an output at $2.4 \times 10^{-11}$ amperes full scale. This is superior to present technology in which columns made by coating a support material with an $AgNO_3$-glycol solution have a temperature limit of approximately 70° C. A thin-layer chromatoplate prepared with $Ag^+$- sulfobenzylsilica was exposed to light for 3 days. It still had the capability of resolving certain standard mixtures of unsaturated compounds whereas an $AgNO_3$ impregnated plate no longer had such capability after the same light exposure. No observable benzenoid absorption or "bleed" was observed when various organic and buffered aqueous solvents were flowed through packed beds of sulfobenzylsilicas and through an untraviolet detector.

The products of this invention were found to be especially useful in various chromatographic procedures. Stationary phases with large ion-exchange capacity have been provided from inexpensive commercial silicas as a result of this invention. Using the technique of sedimentation fractionation, a 12 micron silica fraction, composed of irregular particles, was obtained from a general purpose industrial silica. This absorbent and its sulfobenzyl derivative were found to be useful in high pressure liquid chromatography (HPLC). Plate heights of about 0.5 mm. were obtained on columns packed with unmodified silica. The heights increased to about 3 mm. when compounds having similar capacity factors were chromatographed on sulfobenzylsilica columns. This type of chromatography in conjunction with the present invention was used to assay traces of nitrosoproline in cured meat samples.

Both the hydrogen and silver forms of the silica particles were used to prepare thin-layer chromatographic plates. In the hydrogen form the support demonstrated selectivity for organic ions such as amino acids. Cis and trans isomers of fatty acid methyl esters were separated by the silver form as were mixtures of mono -, di -, and trisaturated glycerides. Repetitive developments on the same plate produced no significant change in Rf.

A more detailed discussion of the utility of the boundmonolayer cation exchangers of this invention in high pressure liquid and thin-layer chromatography for the above stated and other purposes is found in J. Chromatog. Sci. 12, 555–558, 1974, and will not be repeated herein, but will, by this reference, be considered incorporated into this specification as part of this invention.

The silver salt of a sulfobenzyl group, chemically bound through a C — Si bond to the surface of a porous spherical silica was used as a column packing for gas-liquid chromatography. The silica had an average particle diameter range of 160 to 170 $\mu$, a surface area of 50 to 100 $m^2$/gram, and a pore diameter of 200 to 400 angstrom units (Porasil C). The columns, made of tubing two feet long with an inside diameter of 0.062 inches and outside diameter of one-eighth inch, contained 17 to 20 inches of packing. These columns demonstrated a strong affinity for monoelfins in general and a marked differential affinity for cis and trans isomers. On one of these columns at an operating temperature of about 225° C., we separated a mixture of cis and trans 2-hexenes as two symmetrical peaks. Under the same operating conditions, we separated and eluted in less than 30 minutes monoolefins with carbon chain lengths up to 10. However, we found that these columns were not practical for separating the longer chain cis and trans 9-octadecenes and that, in order to separate these and longer chain isomers, the silica modified as just described had to be further modified. The modified silica (silver sulfobenzylsilica) was silanized, that is, treated with hexamethyldisilazane to deactivate surface hydroxyl groups and then coated with 12% ethylene glycol succinate polyester. Cis and trans 9-octadecenes were separated within 25 minutes by gas-liquid chromatography at a temperature of 179° C on a 20 inch long column prepared from the above further modified silica. On a similar column operating at 189° C., methyl cis 9-octadecenoate and methyl trans 9-octadecenoate were separated.

Although silanization can be accomplished by putting the silver sulfobenzylsilica into hexamethyldisilazane and allowing it to remain in contact until the reaction is complete, it is not the preferred method.

In the preferred method, the acid form of sulfobenzylsilica is silanized prior to converting it to the silver form. The following description exemplifies the preferred method but does not limit the invention to the particular amounts of materials, sizes of columns, temperatures, and other factors which can be altered within reasonable limits without making any material change in the invention.

Sulfobenzylsilica (1.5 to 2.0 gms.) in the acid form prepared as previously described was put into steel tubing having a 0.25 inch outside diameter and 0.18 inch inside diameter to form a column which was put into a gas-liquid chromatograph. With helium gas constantly flowing through the column at a rate of about 20–30 c.c. per minute, the column temperature was raised to 200° C. at which point the temperature of the injection port was 245° C. A 100 $\mu l$ portion of hexamethyldisilazane was injected into the column followed by another 100 $\mu l$ portion 30 minutes later. With the column temperature still at 200° C. helium was allowed to flow through the column at the above noted rate for about 16 hours to remove any unreacted hexamethyldisilazane. Since the purpose was to remove excess reagent, the 16 hours is not critical and any period of time that accomplishes the desired result is adequate. The silanized sulfobenzylsilica was removed from the steel tubing and put into a straight piece of one-fourth inch glass tubing as a column and then an amount of 0.1 N $HNO_3$ in excess by about 4 to 5 times of the possible milliequivalents of hydroxyl groups present on the silanized sulfobenzylsilica was put through the column. The purpose of this step is to be sure that all the ion exchange sites are in the acid form. The The column was then washed repeatedly with water until the effluent was neutral. An amount of about 2% aqueous silver nitrate solution in excess of the stoichiometric amount needed to convert the silanized sulfobenzylsilica from the acid form to the silver form was put through the column in small increments. The column was again washed with water until all unreacted silver nitrate was removed and then it was dried by passing nitrogen gas through the column. The silanized silver sulfobenzylsilica was removed from the glass tubing and put in a vacuum oven at about 80° C. and 100 mm. mercury until it was completely dry. The dry material was then coated with 12% ethylene glycol succinate polyester (EGS) by dissolving EGS in methylene chloride to make a 12% solution, putting the dried silanized silver sulfobenzylsilica into the solution and then stirring and warming over a water bath until the methylene chloride was completely evaporated off. The purpose of coating with EGS is to reduce retention times so that the modified silica can be used to separate long chain alkenes and isomers thereof.

Columns made with silica modified by the above described procedure were used to separate cis and trans 9-octadecenes and methyl cis 9-octadecenoate and methyl trans 9-octadecenoate on 20 inch column at 179° C. and 189° C., respectively, as previously noted.

A gas-liquid chromatographic column was prepared from a mixture of one part of the above described silanized silver sulfobenzylsilica, that is, the above described modified silica before it was coated with 12% EGS polyester, and two parts of a silica having an average particle size diameter of 160 to 170 $\mu$ and a surface area of 4 to 6 $m^2$/gs. (Porosil F). The Porosil F was silanized prior to mixing with the modified silica. The mixture was coated with 10% EGS polyester. The column containing about 1.04 gms. of the mixture was 44 inches long in one-sixteenth inch internal diameter tubing. On this column at a temperature of from 200° to 210° C. cis and trans 9-heneicosenes were separated as were Z-4 and E-4 tetra decene-1-ol-acetates.

In making these gas-liquid chromatographic separations, it was found that the purity of the helium gas was important to the life of the columns. In fact, a column in which only a special highly purified helium (1.14 ppm impurities) used was making excellent separations after continuous use for 44 days. The impurities were as follows: water, 0.10 ppm; $H_2$, 0.20 ppm; neon, 0.20 ppm; N, 0.35 ppm; $O_2$, 0.17 ppm; argon, 0.01 ppm; and $CO_2$, 0.11 ppm. It was also found that the life of a column was significantly reduced when the helium contained 1.0 ppm or more of hydrogen.

We claim:

1. A process for preparing sulfobenzylsilica comprising preparing silica chloride by treating silica with thionyl chloride, reacting the silica chloride with benzyllithium and sulfonating the resulting bound benzylsilica with chlorosulfonic acid to obtain sulfobenzylsilica in which the organic moiety is bound to the silica through a carbon-silicon bond and which contains at least 0.2 milliequivalents of acid per gram.

2. The process of claim 1 in which thionyl chloride, benzyllithium and chlorosulfonic acid are present in excess of the stoichiometric amount relative to the amount of reactive sites per gram of silica.

3. The process of claim 2 in which the silica had a particle diameter range of from about 0.01 micron to about 300 microns and a surface area of from about 50 square meters per gram to about 400 square meters per gram.

4. The product of claim 2 wherein the sulfobenzylsilica was made from silica having an average particle diameter of 12 microns.

5. The product of claim 2 wherein the sulfobenzylsilica was made from silica having a particle diameter range of 60 to 200 microns and a surface area of 340 $m^2$/gram.

6. The product of claim 2 wherein the sulfobenzylsilica was made from silica having a particle diameter of 0.012 microns and a surface area of 198 $m^2$/gram.

7. The product of claim 2 wherein the sulfobenzylsilica was made from silica having a particle diameter of 8.0 microns and a surface area of 320 $m^2$/gram.

8. A method of separating for assay purposes traces of nitrosoproline from proline and other components in cured meat samples, comprising treating silica with thionyl chloride, reacting the resultant silica chloride with benzyllithium to obtain benzylsilica, sulfonating the benzylsilica with chlorosulfonic acid to obtain sulfobenzylsilica, said thionyl chloride, benzyllithium, and chlorosulfonic acid being present in excess of the stoichiometric amount, converting the sulfobenzylsilica by standard procedures to the sodium form, packing a high-pressure liquid chromatography column with the sodium form of the sulfobenzylsilica, transferring the cured meat sample to the column, and eluting with aqueous methanol to obtain nitrosoproline.

9. A process for preparing silver sulfobenzylsilica in which the silver benzylsulfonate is chemically bound to the silica and which is useful in thin-layer and gas-liquid chromatography for the separation of cis and trans alkene isomers, comprising chlorinating the reactive silanol groups of silica by treating it with thionyl chloride, reacting the chlorinated product with benzyllithium, sulfonating the resultant benzylsilica to obtain sulfobenzylsilica, said thionyl chloride, benzyllithium and chlorosulfonic acid being present in excess of the stoichiometric amount and reacting the sulfobenzylsilica with silver nitrate to produce silver sulfobenzylsilica.

10. A process for preparing a bound stationary phase having the capacity to separate long chain cis and trans alkene isomers comprising treating silica with thionyl chloride to obtain silica chloride, reacting the silica chloride with benzyllithium and sulfonating the resultant benzylsilica with chlorosulfonic acid to obtain sulfobenzylsilica, said thionyl chloride, benzyllithium, and chlorosulfonic acid being present in excess of the stoichiometric amount, converting the sulfobenzylsilica to the silver salt by reacting it with silver nitrate, treating the silver sulfobenzylsilica with hexamethyldisilazane to deactivate surface hydroxyl groups, and coating the modified silica with 12% ethylene glycol succinate polyester.

11. A process for modifying the acid form of sulfobenzylsilica so that it has the capacity as a bound, stationary phase of separating long chain cis and trans alkene isomers, comprising the steps of:
 a. inserting tubing containing the acid form of the sulfobenzylsilica into a gas-liquid chromatograph;
 b. allowing helium gas to flow through the column of sulfobenzylsilica;
 c. heating the column to about 200° C.;
 d. silanizing the sulfobenzylsilica by injecting hexamethyldisilazane into the column and then removing unreacted hexamethyldisilazane;
 e. removing the silanized sulfobenzylsilica from the steel tubing and treating it with dilute nitric acid;
 f. washing the product of step (f) until the wash is neutral;
 g. treating the product of step (g) with about 2% aqueous silver nitrate to convert the product to the silver form, the amount of silver nitrate solution being in excess of the stoichiometric amount and then removing unreacted silver nitrate;

h. drying the silanized silver sulfobenzylsilica;

i. coating the dried product of step (h) with 12% ethylene glycol succinate polyester.

12. The process of claim 11 in which the helium gas was highly purified and contained not more than 1.14 ppm impurities.

13. The modified sulfobenzylsilica prepared by the process of claim 12.

14. A process for preparing a stationary phase for gas-liquid chromatography comprising mixing two parts of a silanized silica having an average particle size diameter of 160 to 170 microns and a surface area of 4 to 6 $m^2$/grams with one part of a silanized silver sulfobenzylsilica and then coating the mixture with 10% ethylene glycol succinate polyester.

15. The stationary phase of claim 14.

16. A process for separating cis and trans 9-heneicosenes and Z-4 and E-4 tetradecene-1-ol-acetates, comprising packing a gas-liquid chromatographic column with a stationary phase of claim 15, heating it to about 200° to 210° C., and injecting samples of the mixtures to be separated into the column.

* * * * *